(12) United States Patent
Fang

(10) Patent No.: US 6,631,835 B2
(45) Date of Patent: Oct. 14, 2003

(54) OBJECT STORING CASE OF A MOTORCYCLE

(75) Inventor: Tien-Ching Fang, Tainan (TW)

(73) Assignee: Tian Shwu Co., Ltd., Tainan (TW)

( * ) Notice: Subject to any disclaimer, the term of this patent is extended or adjusted under 35 U.S.C. 154(b) by 37 days.

(21) Appl. No.: 10/072,935

(22) Filed: Feb. 12, 2002

(65) Prior Publication Data

US 2003/0150894 A1 Aug. 14, 2003

(51) Int. Cl.[7] .............................. B62J 7/00; B62J 9/00
(52) U.S. Cl. ..................... 224/413; 224/315; 224/431; 224/435
(58) Field of Search ................................ 224/315, 413, 224/431, 435; 280/769; 70/63, 161, 264, 288, DIG. 34

(56) References Cited

U.S. PATENT DOCUMENTS

| | | | | |
|---|---|---|---|---|
| 4,163,513 | A | * | 8/1979 | Kramer .................... 224/413 |
| 4,435,966 | A | * | 3/1984 | Craig ........................ 70/161 |
| 4,907,428 | A | * | 3/1990 | Nakashima et al. ......... 70/264 |
| 4,997,118 | A | * | 3/1991 | Uebach et al. ............. 224/315 |
| 5,439,149 | A | * | 8/1995 | Walter et al. .............. 224/413 |
| 6,481,605 | B1 | * | 11/2002 | Vincenzo ................... 224/413 |
| 2001/0030215 | A1 | * | 10/2001 | Vincenzo ................... 224/435 |
| 2001/0030438 | A1 | * | 10/2001 | Kamemizu et al. .......... 70/264 |

FOREIGN PATENT DOCUMENTS

DE 3340137 A1 * 5/1985 ................. 224/315

* cited by examiner

Primary Examiner—Gary E. Elkins
(74) Attorney, Agent, or Firm—Rosenberg, Klein & Lee

(57) ABSTRACT

A object storing case of a motorcycle includes a connecting part disposed in a recess of a rear side of a holding body thereo, a fixing plate pivoted to the connecting part at the middle, a locking member and an operating member. The locking member is pivoted to the connecting part, and the fixing plate is pivoted to the locking member at a lower end such that the locking member can be turned for moving the fixing plate between an engaging position and a disengaging one in relation to a cover of the case. The locking member is equipped with a combination lock, and has a sloping slot extending from the lower edge, through which a spindle of the operating member is passed. The operating member further has a commoving pole associated with a stopping plate capable of being locked with the combination lock. Thus, when the operating member is turned to an "open" position where an operated portion thereof is aligned with the sloping slot, the locking member can be pivoted Up for the fixing plate to disengage the cover. When the operating member is turned to a "lock" position where the operated portion crosses the sloping slot, the cover can't be opened; the combination lock can be used to prevent the operating member from turning away from the "lock" position. When the operating member is turned to a "release" position where the operated portion also crosses thief sloping slot, the cover can't be opened but the case can be removed from the motorcycle because an engaging element of an inner end of the spindle disengages a blocking part of the motorcycle.

3 Claims, 9 Drawing Sheets

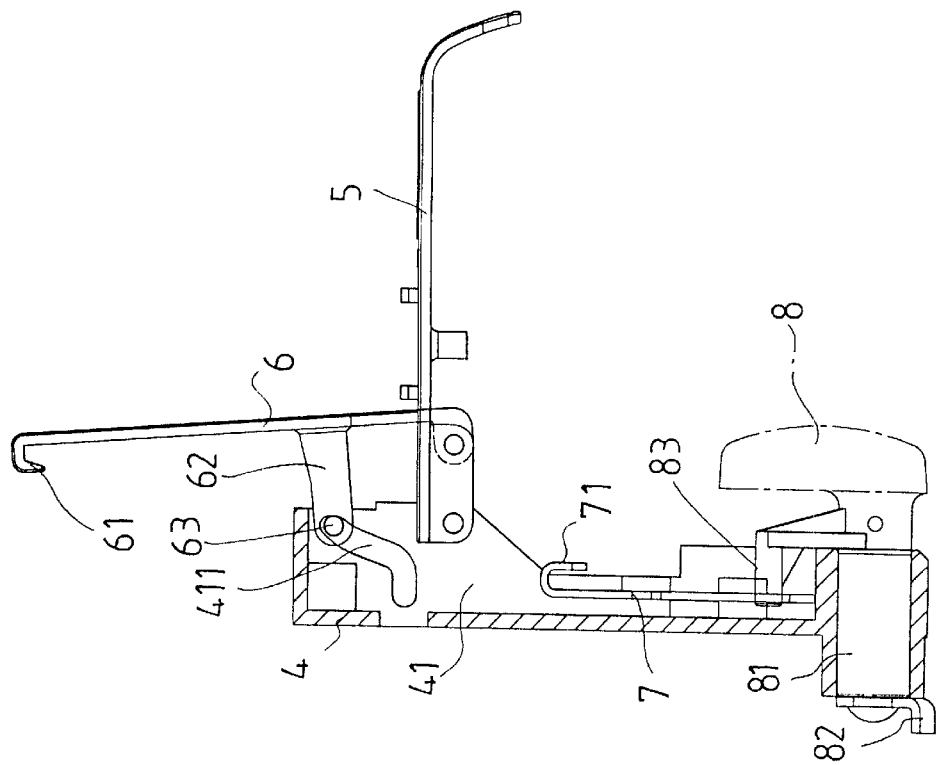
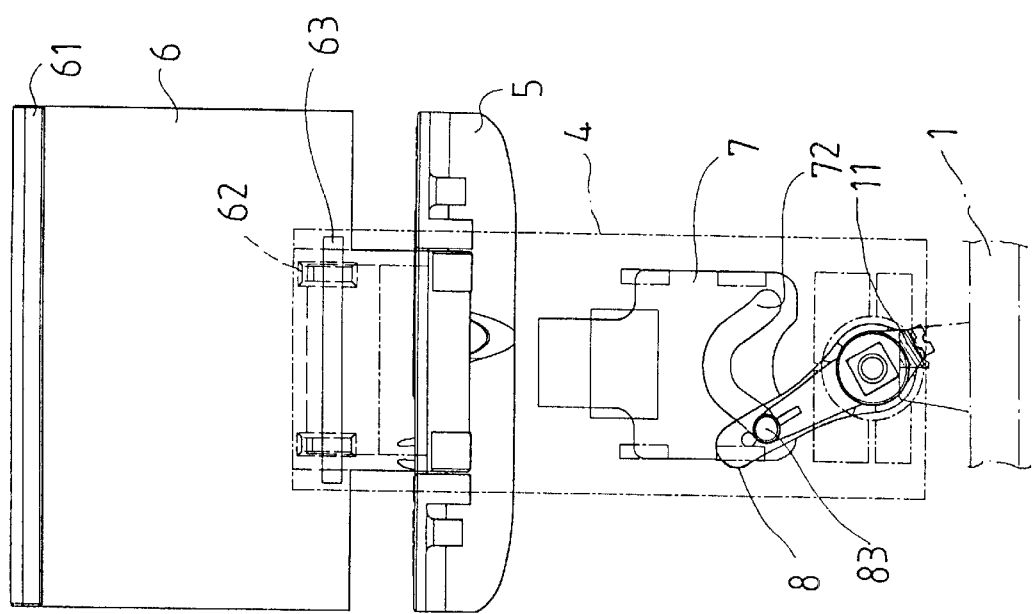

OBJECT STORING CASE OF A MOTORCYCLE

BACKGROUND OF THE INVENTION

The present invention relates to an object storing case of a motorcycle, and more particularly, an object storing case that can be easily operated from a fixed and closed position to a removable but closed one, and a fixed but opened one.

A motorcycle can be equipped with an object storing case behind the seat such that it can carry more objects. Referring to FIGS. 1, 2 and 3, a conventional object storing case of a motorcycle includes a holding part 10, a cover 20, locking member 30, and a depressible block 50. The cover 20 is pivoted to a front portion of the holding part 10 at a front portion thereof, and has an engaging trench 201 (FIG. 1) on the inner side of a rear portion.

The holding part 10 has a stopping plate 40, a through hole 302, and a depressible block 50 at the rear portion. The depressible block 50 has a stopping. protrusion 501 opposing the stopping plate 40, and a blocked part 502 sticking inwardly of the holding part 10. The depressible block 50 is biased outwardly of the holding part 10 by an elastic element connected to the blocked part 502 such that the rear end portion of the block 50 normally sticks out from the through hole 302.

The locking member 30 has an elongated shape, and is pivoted to the rear portion of the holding part 10 from a middle part thereof such that it can be operated like a lever; the upper end of the locking member 30 has a hooked shape to unlockably engage the engaging trench 201 of the cover 20; the lower portion of the locking member 30 is equipped with a lock device 301, which needs to be used together with a key, and has an engaging plate. 303.

The storing case is removably fixed to a rear object supporting portion 60 of a motorcycle with the blocked part 502 of the depressible block 50 being engaged with a blocking part 601 of the rear supporting portion 60. When the cover 20 is closed, and the lock device 301 is moved to a locking position where the engaging plate 303 engages both the stopping plate 40 and stopping protrusion 501, the cover can be fixed in position by means of the upper hooked end of the locking member 30 engaging the trench 201 of the cover 20. In order for the storing case to be removable from the rear supporting portion 60, the lock device 301 is moved to an unlocking position where the engaging plate 303 disengages both the stopping plate 40 and the stopping, protrusion 501 and where the cover 20 can be opened, thus allowing the depressible block 50 to be pressed into the through hole 302 for the blocked part 502 to disengage the blocking part 60.

From the above description, it can be easily seen that the conventional storing case of a motorcycle has a drawback that it can't be removed from the motorcycle unless the lock device 301 is first moved to the unlocking position where the cover 20 can be opened. In other words, the cover 20 becomes unwantedly openable when the whole storing case is being moved from the motorcycle. In addition, a key has to be used for closing and opening the cover, causing the user inconvenience.

SUMMARY OF THE INVENTION

Therefore, it is a main object of the present invention to provide an object storing case, of which the cover is fixed in locked position when the same is being removed from a motorcycle; thus, the same can be operated among three positions: (1) the cover being closed and the storing case fixed to the motorcycle; (2) the cover being opened and the storing case fixed to the motorcycle; (3) the cover being closed and the storing case removed from the motorcycle.

The object storing case of a motorcycle of the present invention includes a cover, a holding part, a connecting part, and a locking assembly. The cover has an engaging trench at an inner side of a rear portion. The cover is pivoted to the holding part from a front portion. The connecting part is fixedly disposed in a recess of the rear side of the holding part.

The locking assembly includes a locking member, a fixing plate, a stopping plate, a combination lock, and an operating member.

The locking member is pivoted to the connecting part, and has a sloping slot. The fixing plate is pivoted to the connecting part from a middle, and pivoted to the locking member from a lower end. The fixing plate can disengagably engage the trench of the cover from an upper hooked portion.

The stopping plate is up and down movably placed between the connecting part and the locking member, and has an inverted-V shaped slot at a middle. The combination lock is fitted to the locking member for unlockably locking the stopping plate.

The operating member is passed through both the sloping slot and the connecting part from a spindle, and has a commoving pole passed through the inverted-V shaped slot so as to be stopped from turning when the stopping plate is locked with the combination lock. The operating member has an operated portion, and an engaging element at an outer, and an inner end of the spindle respectively; the engaging element can separably engage a blocking pair at a rear support of a motorcycle for fixing the case on the rear support.

Thus, when the operating member is turned for the operated portion to be aligned with the sloping slot, the cover can be opened. And, when the cover is closed and the operated portion crosses the sloping slot at a second position with the stopping plate being locked with the combination lock, the case is fixed to the motorcycle and the cover can't be opened. When the operated portion crosses the sloping slot at a third position, the case is removable from the motorcycle with the cover still being closed.

BRIEF DESCRIPTION OF THE DRAWINGS

The present invention will be better understood by reference to the accompanying drawings, wherein:

FIG. 7 is a fragmentary side view of the storing case of the present invention.

FIG. 8 is a fragmentary rear view of the storing case of the present invention.

DETAILED DESCRIPTION OF THE PREFERRED EMBODIMENTS

Figure 1:
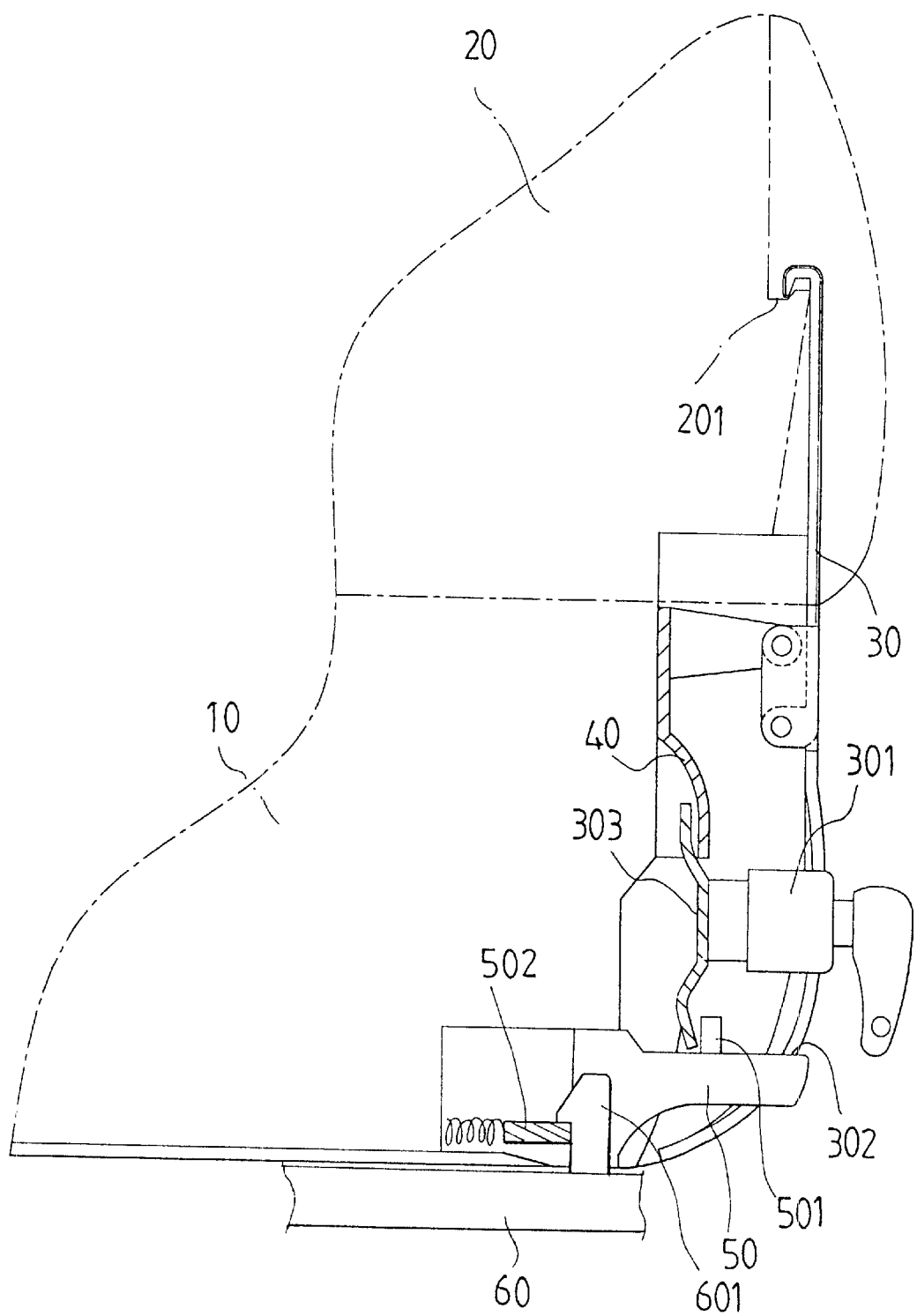
FIG. 1 is a side view of the conventional storing case of a motorcycle.
Figure 2:
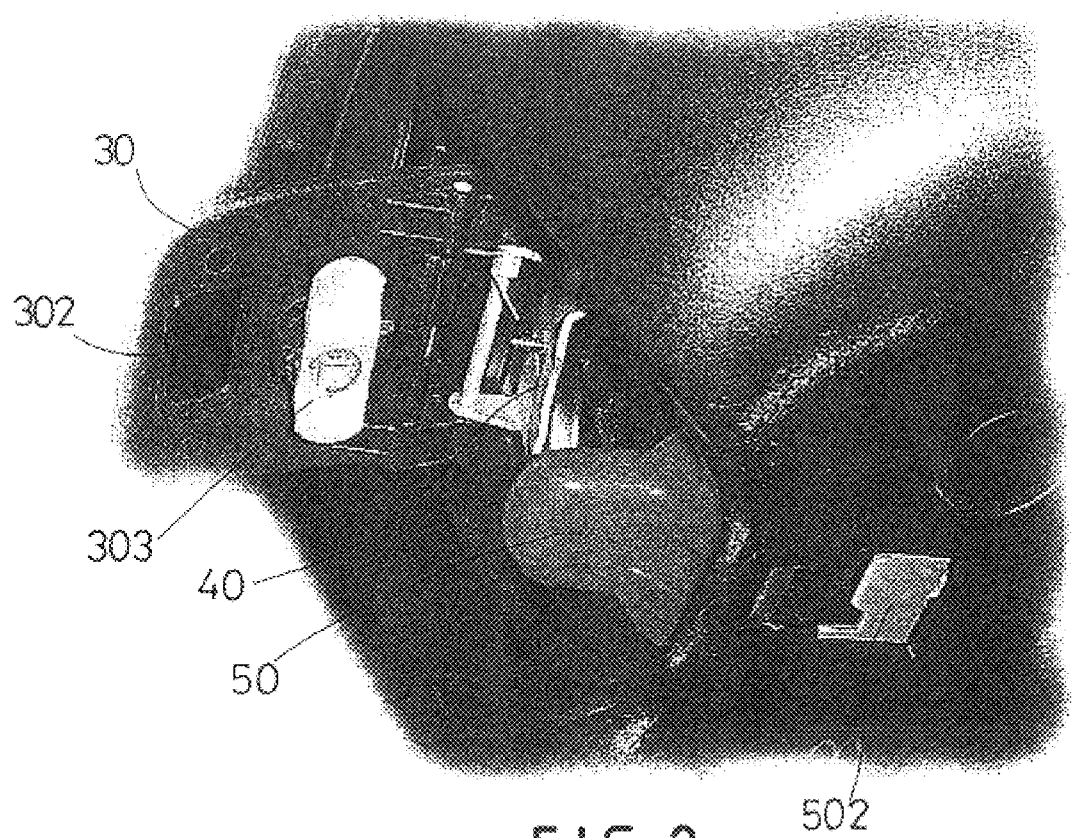
FIG. 2 is a fragmentary perspective view of the conventional storing case.
Figure 3:
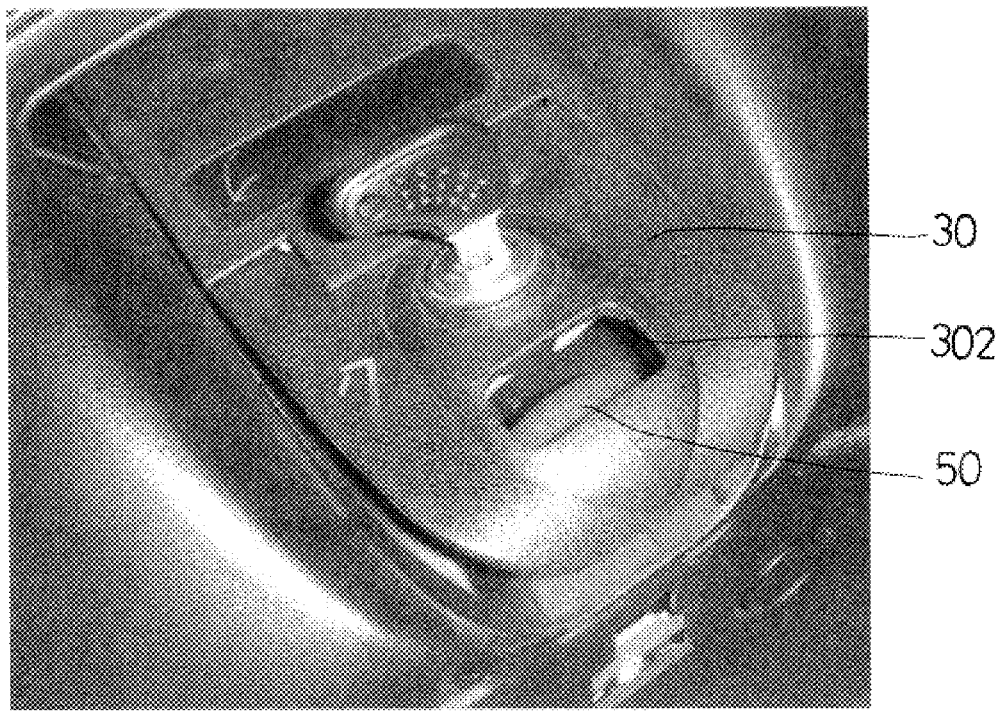
FIG. 3 is another fragmentary perspective view of the conventional storing case.
Figure 4:
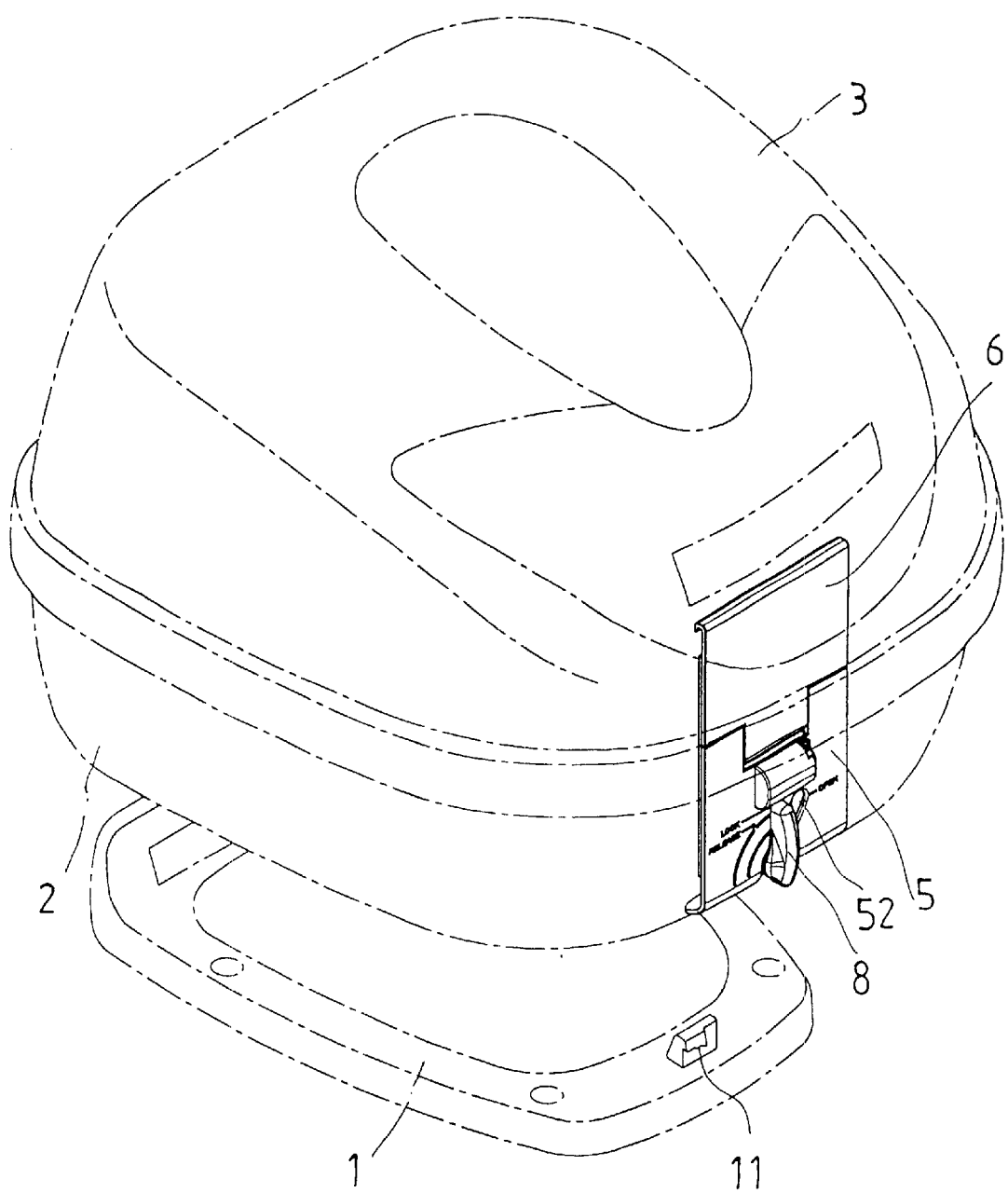
FIG. 4 is a perspective view of the storing case of the present invention.
Figure 5:
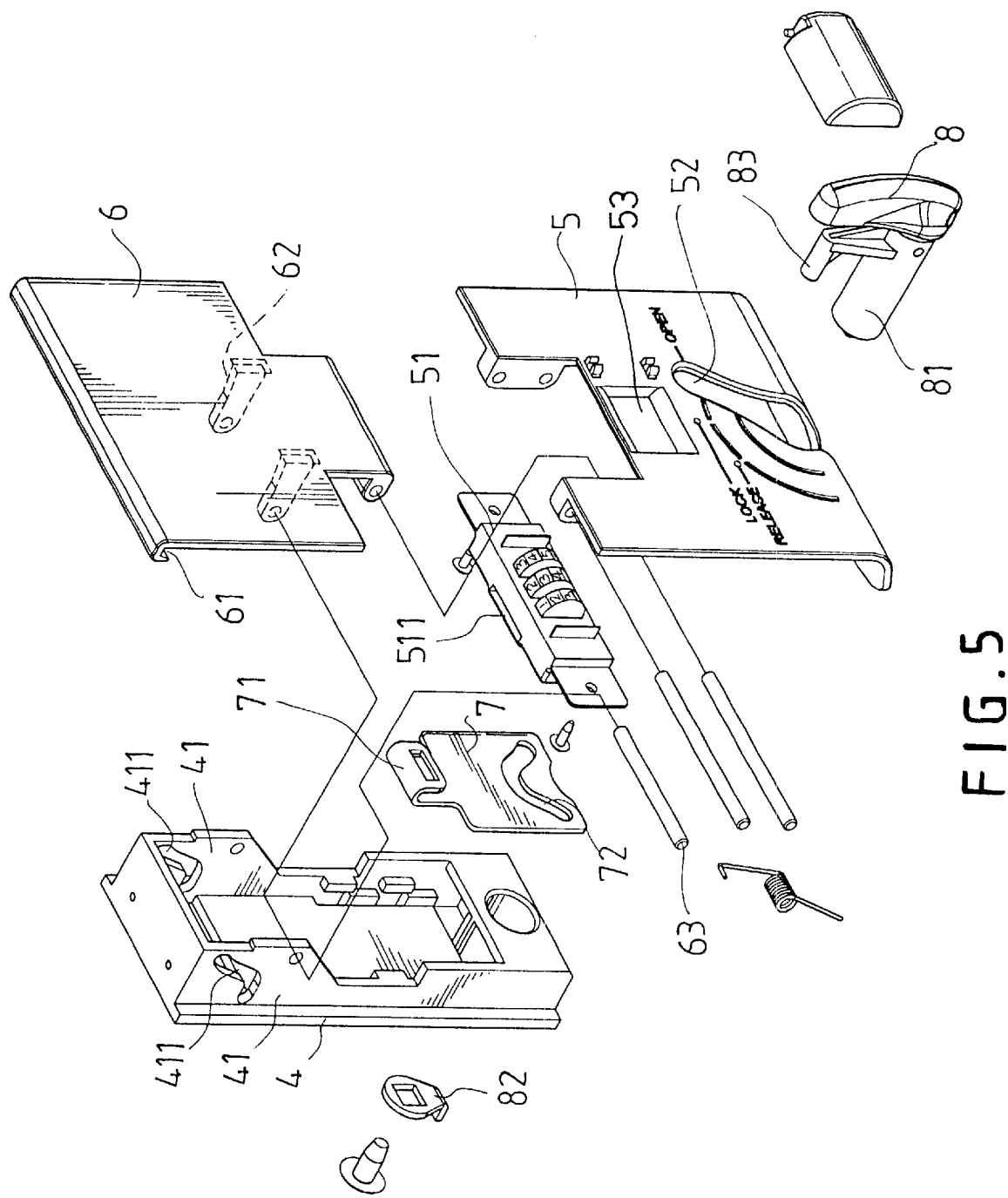
FIG. 5 is a fragmentary exploded perspective view of the storing case of the present invention.
Figure 6:
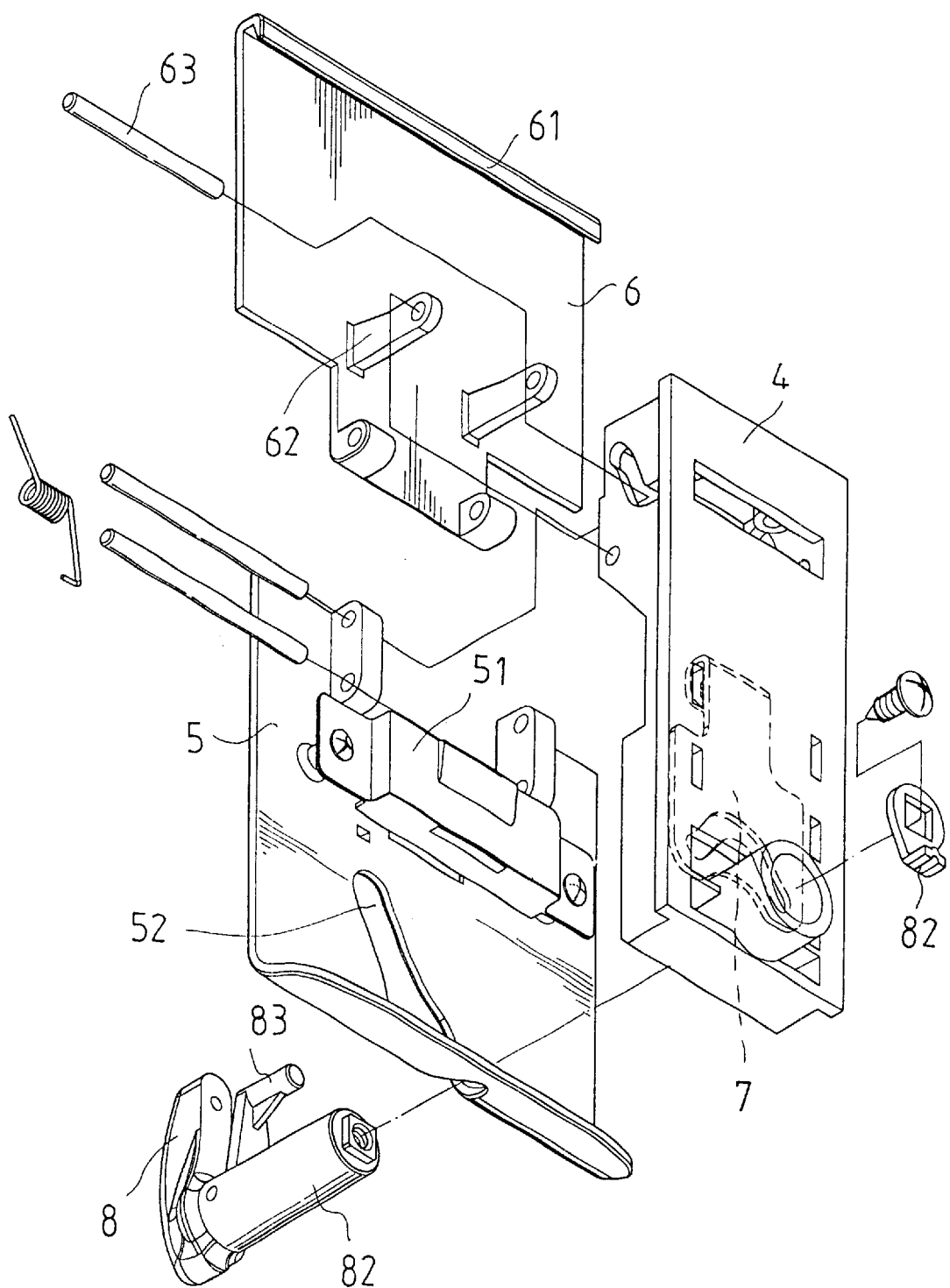
FIG. 6 is another fragmentary exploded perspective view of the storing case of the present invention.

Referring to FIGS. 4–6, an object storing case of a motorcycle in the present invention includes a holding part 2, a cover 3, a connecting part 4, a locking member 5, an operating member 8 and a fixing plate 6.

The cover 3 is pivoted to front portion of the holding part 2 from a front portion thereof and has an engaging trench 31 (FIG. 9) on the inner side of a rear portion.

The holding part 2 has a recess (not numbered) at the rear portion. The connecting part 4 is fixedly disposed in the recess of the holding part 2, and has two parallel opposing lateral walls 41, which have opposing guiding holes 411 and opposing pivotal holes (not numbered).

The fixing plate 6 has an upper hooked end portion 61, and two parallel protrusions 62, which have holes and stick out from the middle portion. The fixing plate 6 is pivoted to guiding holes 411 of the connecting part 4 by means of a pivotal rod 63 passing through the holes of the protrusions 62 of the fixing plate 6 plus the guiding holes 411. The upper hooked end portion 61 is provided for unlockably engaging the engaging trench 31 of the cover 3 so as to fix the cover 3 in a closed position.

The locking member 5 is substantially shaped like a plate, and has an opening 53, and a sloping slot 52 extending from the lower edge to the middle portion thereof A combination lock 51 is secured to the locking member 5 with the numeral dials thereof sticking out from the opening 53. The combination lock 51 has a trench 511 on the upper side. The locking member 5 is pivoted to the pivotal holes of the connecting part, and the fixing plate 6 is pivoted to an upper portion of the locking member 5 from a lower end portion thereof such that the locking member 5 can be moved for changing an orientation of the fixing plate 6 in relation to the cover 3; when the locking member 5 is positioned parallel to the rear side of the holding part 2, the hooked end portion 61 of the fixing plate 6 will engage the engaging trench 31 of the cover 3; when the locking member 5 is positioned perpendicular to the rear side of the holding part 2, the hooked end portion 61 will disengage the engaging trench 31, allowing the cover 3 to be opened.

A stopping plate 7 is placed between the combination lock 51 and the connecting part 4. The stopping plate 7 has a hooked upper end portion 71 having an engaging hole (not numbered), and an inverted-V shaped guiding slot 72 at he lower portion. The stopping plate 7 can be fixed in position by means of the combination lock 51 after the hooked upper end portion 71 is inserted into the trench 511 of the lock 51.

Figure 9:
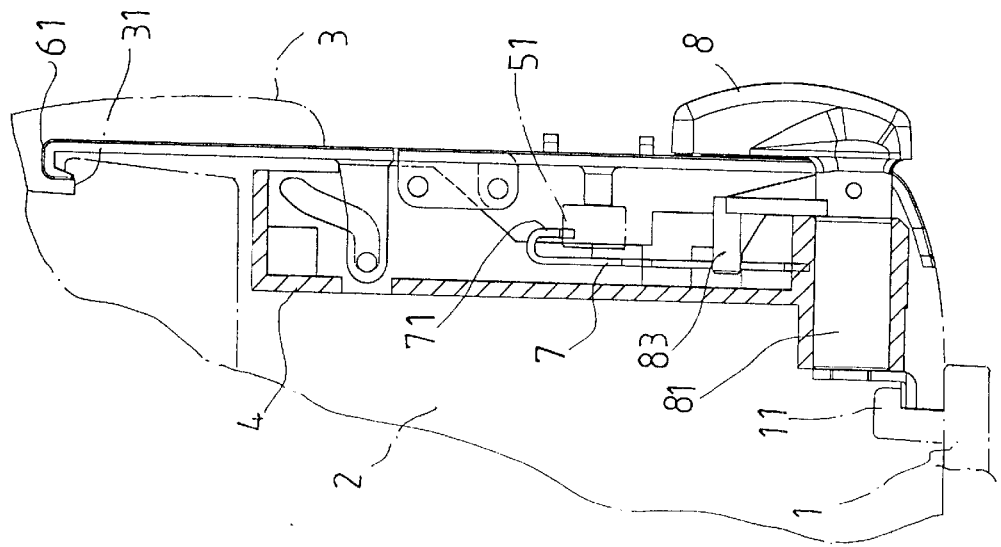
FIG. 9 is a fragmentary side view of the present storing case under operation.

The operating member 8 has a spindle 81, a commoving pole 83, and an operated portion (not numbered) for a user to hold with fingers. The spindle 81 is passed through the sloping slot 52, a lower hole of the connecting part 4 with the commoving pole 83 being passed through the inverted-V shaped slot 72; an L-shaped engaging element 82 is connected to an inner end of the spindle 81 for preventing the operating member 8 from falling out. Referring to FIG. 9, the engaging element 82 has a lower engaging portion (not numbered), which can separably engage a blocking part 11 of a rear supporting portion 1 of a motorcycle.

When the operating member 8 is turned to a first position where the commoving pole 83 is placed in a right end (FIG. 5) of the guiding slot 72 of the stopping plate 7, the operated portion of the operating member 8 is aligned with the sloping slot 52, allowing the locking member 5 to be pivoted to the position perpendicular to the rear side of the holding part 2, and the fixing plate 6 to disengage the cover 3, as shown in FIG. 7. Therefore, the cover 3 can be opened. At the same time the L-shaped engaging element 82 engages the blocking part 11 of the rear supporting portion 1 of the motorcycle, therefore the storing case can't be removed from the motorcycle.

Figure 10:
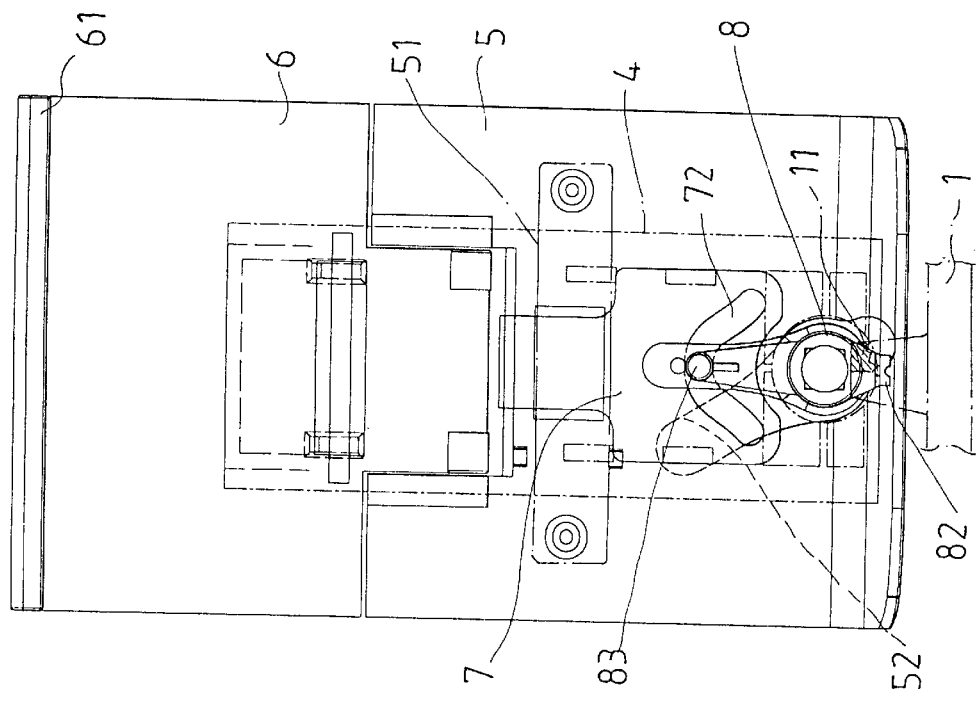
FIG. 10 is fragmentary rear view of the present storing case under operation.

To fix the cover 3 in the closed position, the locking member 5 is pivoted down for the fixing plate 6 to engage the engaging trench 31 of the cover 3, and the operating member 8 is turned to a second position where the commoving pole 83 is received in the middle of the guiding slot 72 and the member 8 crosses the slot 52 as shown in FIG. 10 and where the hooked upper end portion 71 of the plate 7 is inserted into the trench 511 of the combination locked 51 to be locked with the same; thus, the stopping plate 7 is fixed in position to prevent the operating member 8 from turning. At the same time, the L-shaped engaging element 82 still engages the blocking part 11, therefore the cover 3 is fixed in the closed position, and the whole storing case can't be removed from the motorcycle.

Figure 11:
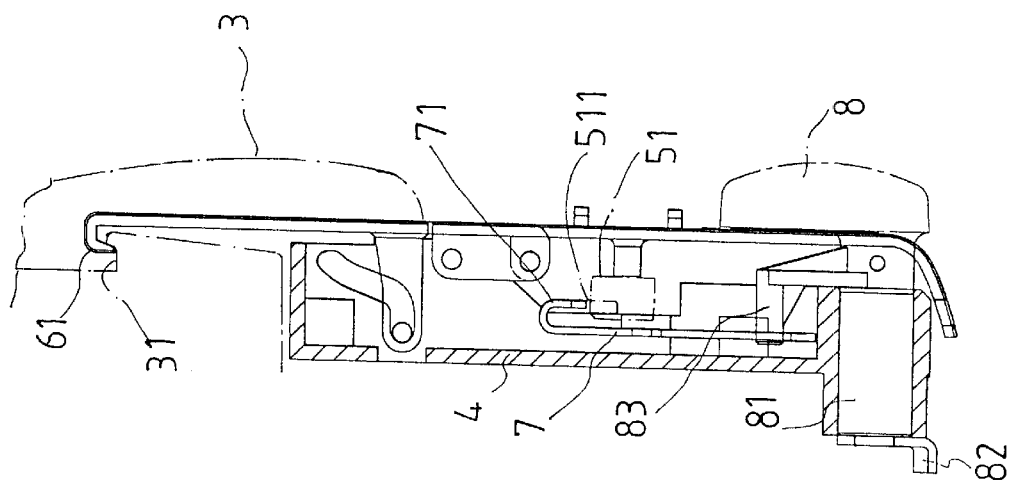
FIG. 11 is another fragmentary side view of the present storing case under operation.
Figure 12:
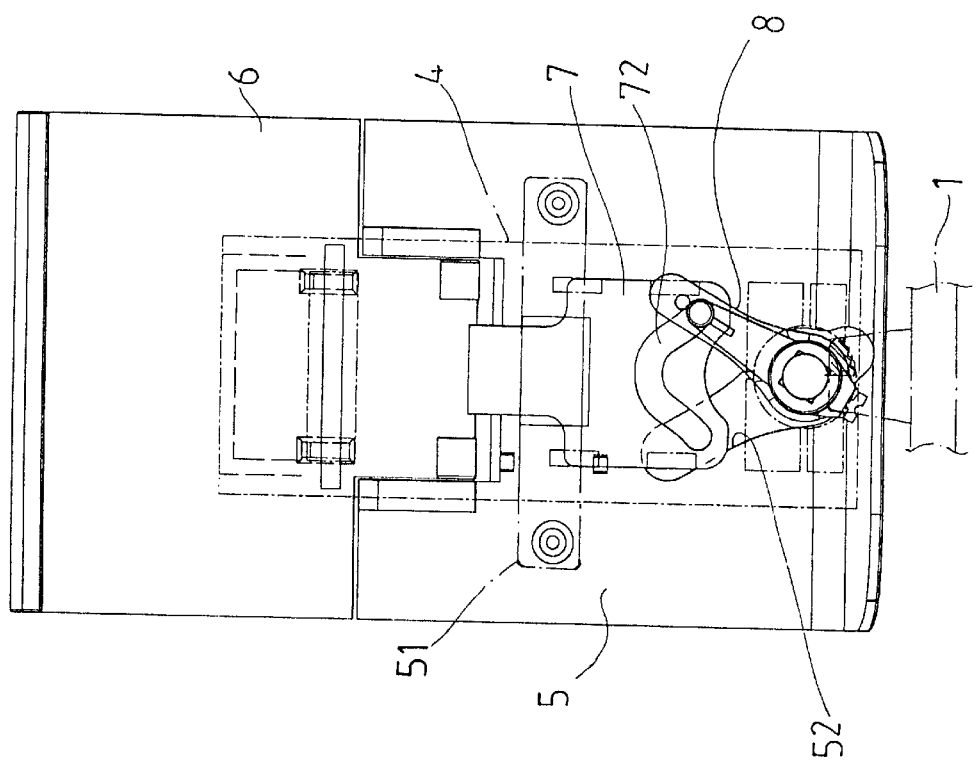
FIG. 12 is another fragmentary rear view of the present storing case under operation.

To remove the storing case from the motorcycle, first the combination lock 51 has to be operated for releasing the stopping plate 7, thus allowing the operating member 8 to turn. Thus, the operating member 8 is turned to a third position where the commoving pole 83 is received in the left end of the guiding slot 72 (FIG. 5) such that the L-shaped engaging element 82 disengages the blocking part 11. Therefore, the cover 3 is still fixed in the closed position but the whole storing case can be removed from the motorcycle, as shown in FIGS. 11 and 12.

From the above description, it can be easily understood that the present object storing case of a motorcycle overcomes the drawbacks of the conventional case in the background because the cover is still fixed in the closed position when it is removable from the motorcycle, and no key has to be used for the operation thereof

What is claimed is:

1. An object storing case of a motorcycle, comprising a cover having an engaging trench on an inner side of a rear portion;

a holding part, said cover being pivoted to said holding part from a front portion; said holding part having a connecting part fixedly disposed in a recess of a rear side thereof, a locking assembly including a locking member pivoted to said connecting part from an upper end portion; said locking member having a sloping slot extending from a lower edge to a middle thereof;

a fixing plate pivoted to said connecting part from a middle and pivoted to said locking member from a lower end; said fixing plate having an upper hooked portion disengagably engaging said trench of said cover;

a stopping plate up and down movably disposed between said connecting part and said locking member; said stopping plate having upper hooked portion and a slot at a middle;

a lock device fitted to said locking member; said lock device having an upper trench for said upper hooked portion of said stopping plate to be received in and fixed in position by said lock device;

an operating member passed through both said sloping slot of said locking member and said connecting part from a spindle thereof; said operating member having a commoving pole passed through said elongated slot of said stopping plate so as to be stopped from turning by means of said stopping plate being locked with said lock device; said operating member having an operated portion connected to an outer end of said spindle and an engaging element connected to an inner end of said spindle; said engaging element being capable of separably engaging a blocking part of a rear supporting portion of a motorcycle for fixing said storing case in position when said storing case is placed on said rear supporting portion;

whereby said case is provided with three different positions by means of turning said operating member;

said fixing plate disengaging said trench of said cover for allowing said cover to be opened when said operating member is turned for said operated portion thereof to be aligned with said sloping slot and said fixing plate is pivoted to an disengaging position together with said locking member; said fixing plate fixing said cover in a closed position when said operated portion crosses said sloping slot to fix both said locking member plus said fixing plate in position with said lock device locking said stopping plate to prevent said operating member from turning;

said engaging element disengaging said blocking part for allowing said case to be removed from said motorcycle when said operating member is turned to a third position where said operated portion still crosses said sloping slot to make said fixing plate fix said cover in said closed position.

2. The object storing case of a motorcycle as claimed in claim 1, wherein said lock device is a combination lock.

3. The object storing case of a motorcycle as claimed in claim 1, wherein said slot of said stopping plate has an inverted-V shape.

* * * * *